United States Patent [19]

Sato et al.

[11] Patent Number: 5,464,908
[45] Date of Patent: Nov. 7, 1995

[54] PROCESS FOR PREPARING WATER-SOLUBLE POLYMERS

[75] Inventors: Shin-ichi Sato; Kiyoji Kuma, both of Kitakyushu, Japan

[73] Assignee: Mitsubishi Kasei Corporation, Tokyo, Japan

[21] Appl. No.: 128,318

[22] Filed: Sep. 29, 1993

Related U.S. Application Data

[63] Continuation of Ser. No. 951,068, Sep. 25, 1992, abandoned.

[30] Foreign Application Priority Data

Sep. 27, 1991 [JP] Japan ..................................... 3-249386

[51] Int. Cl.$^6$ ....................................................... C08F 8/12
[52] U.S. Cl. ........................... 525/380; 525/344; 525/355; 525/373; 525/328.2; 526/307.1; 528/492
[58] Field of Search ..................................... 525/380, 373, 525/355, 344, 328.2; 526/307.1; 528/492

[56] References Cited

U.S. PATENT DOCUMENTS

| | | | |
|---|---|---|---|
| 4,238,579 | 12/1990 | Leonard, Jr. et al. | .................. 525/330 |
| 4,242,247 | 12/1980 | Pellon et al. | ............................. 523/337 |
| 4,578,515 | 3/1986 | Dawson et al. | ......................... 564/215 |
| 4,828,725 | 5/1989 | Lai et al. | .......................... 525/328.2 X |

FOREIGN PATENT DOCUMENTS

| | | |
|---|---|---|
| 4007311 | 3/1990 | Germany . |
| 4007311A1 | 9/1991 | Germany . |
| 61-141712 | 6/1986 | Japan . |
| 1-163208 | 6/1989 | Japan . |
| 5-125109 | 5/1993 | Japan . |

OTHER PUBLICATIONS

J. March, Advanced Organic Chemistry, 4th Ed. Wiley, 1992, p. 906.

*Primary Examiner*—Mark Nagumo
*Attorney, Agent, or Firm*—David G. Conlin; George W. Neuner

[57] ABSTRACT

Disclosed herein is a process for preparing a water-soluble polymer comprising subjecting an N-vinylcarboxylic acid amide alone or a mixture of the N-vinylcarboxylic acid amide and other water-soluble vinyl compound(s) copolymerizable therewith to suspension polymerization, and adding hydroxylamine followed by acidic hydrolysis. A water-soluble can be polymerized efficiently without forming gel.

18 Claims, No Drawings

PROCESS FOR PREPARING WATER-SOLUBLE POLYMERS

This is a continuation of application Ser. No. 07/951,068, filed on Sep. 25, 1992, now abandoned.

BACKGROUND OF THE INVENTION

1. Field of the Invention

The present invention relates to a process for preparing a water-soluble polymer, more particularly, to a process for preparing a modified or at least hydrolyzed product of a water-soluble N-vinylcarboxylic acid amide (co)polymer.

2. Description of the Prior Art

Water-soluble polymers containing vinylamine units are expected to be utilized as flocculants and paper-treating agents having excellent benefits. Generally, such water-soluble polymers may be prepared by polymerizing an N-vinylcarboxylic acid amide alone or together with other ethylenically unsaturated monomer(s) followed by acidic or basic hydrolysis, as shown in Japanese Patent Publication (Kokoku) No. 63-9523, and Japanese Patent Application Laying-open (Kokai) Nos. 62-74902 and 63-218718.

In such conventional processes, however, the products in the hydrolysis step tend to form gels or be insolubilized in water, making it difficult to produce powdery water-soluble polymers with good quality efficiently.

The present inventors have investigated the cause of the problem and found that gels tend to be formed when a larger amount of unreacted N-vinylcarboxylic acid amide monomer remains. Generally, such unreacted monomers may be reduced by increasing the reaction period or polymerization temperature; however, these methods are not preferable since the polymers are not always stable. Another method may be elimination of monomers by washing after polymerization; however, this leads to a complicated process and is not industrially advantageous.

SUMMARY OF THE INVENTION

The present inventors have further made a great effort to solve the above mentioned problem and finally found that by adding hydroxylamine after polymerization, the amount of remaining N-vinylcarboxylic acid amide monomers can be significantly reduced and the gelling of the modified or hydrolyzed products after subsequent acidic hydrolysis may be effectively prevented, resulting in powdery water-soluble polymers. Thus, the present invention has attained.

Accordingly, a principle object of the present invention is to provide an improved process for preparing a water-soluble polymer without forming gels.

The present invention is a process for preparing a water-soluble polymer comprising subjecting an N-vinylcarboxylic acid amide alone represented by the general formula:

wherein R is a hydrogen atom or a methyl group, or a mixture of the N-vinylcarboxylic acid amide and other water-soluble vinyl compound(s) copolymerizable therewith to suspension polymerization, and then adding hydroxylamine followed by acidic hydrolysis.

DESCRIPTION OF THE INVENTION

The invention will be fully described hereinbelow.

The N-vinylcarboxylic acid amides represented by the general formula:

wherein R is a hydrogen atom or a methyl group, which may be used in the invention include N-vinylformamide and N-vinylacetamide. For the purpose of the invention to obtain hydrolysates of N-vinylcarboxylic acid amide polymers, N-vinylformamide is preferable due to good hydrolyzability of the resulting polymers.

In the polymerization step of the present process, N-vinylcarboxylic acid amide is used alone or in the form of a mixture thereof with at least one other water-soluble vinyl compound. The water-soluble vinyl compounds which may be used are those compounds which are copolymerizable with the N-vinylcarboxylic acid amide and substantially insoluble in hydrocarbon solvents used in the polymerization step. Examples thereof may include water-soluble vinyl compounds, such as acrylonitrile, mathacrylonitrile, acrylamide, methacrylamide, acrylic acid, methacrylic acid, acryloyloxyethyltrimethylammonium chloride, methacryloyloxyethyltrimethylammonium chloride and vinyl acetate. When the N-vinylcarboxylic acid amide (A) is copolymerized with the water-soluble vinyl compound(s) (B), the molar ratio of (A) to (B) is not specifically limited and generally in the range of from 20:80 to 95:5, preferably from 30:70 to 90:10, more preferably from 40:60 to 80:20.

According to the present invention, the monomer(s) is/are subjected to suspension (co)polymerization, i.e., (co)polymerization in water in oil suspension. The concentration of an aqueous solution of starting monomer(s) used is generally in the range of 5 to 95% by weight, preferably 20 to 80% by weight. A water-insoluble hydrocarbon solvent is used as a dispersion medium, generally in an amount of 0.5 to 10 times, preferably 1 to 5 times, the weight of the aqueous solution. Preferably, the hydrocarbon dispersion medium is a hydrocarbon which may form an azeotrope with water. Examples may include saturated linear hydrocarbons, such as n-hexane, n-heptane, n-octane, nonane, decane, undecane and dodecane; petroleum fractions having a boiling point of 65° to 250° C., preferably 80° to 180° C.; cycloaliphatic hydrocarbons, such as cyclohexane and methylcyclohexane; and aromatic hydrocarbons, such as benzene, toluene, xylene and ethylbenzene.

Generally, a dispersion stabilizer is also used in the suspension polymerization. The stabilizer may be non-emulsifiable, oil-soluble polymers or conventional surfactants. The non-emulsifiable, oil-soluble polymers may include oil-soluble cellulose such as ethylcellulose and hydroxyethylcellulose, and adducts of olefins and maleic anhydride. The surfactants may preferably be nonionic surfactants having HLB of 9 or higher, for example, polyoxyethylene alkyl ethers and polyoxyethylene alkyl phenyl ethers. The amount of dispersion stabilizer used is generally in the range of 0.01 to 5% by weight, preferably 0.05 to 1% by weight.

The polymerized products from the above polymerization step are obtained in particulate form and may be efficiently treated with hydroxylamine and hydrolyzed in the subsequent steps.

Optionally, a polymerization stabilizer such as ammonium or calcium chloride may be added in the polymerization system. Such an additive may generally be used in an amount of 0.1 to 20% by weight, preferably 1 to 15% by weight, based on the total monomer(s). When the additive is used together with hydroxylamine, the amount of the latter may be reduced.

A polymerization initiator used may be any of conventional radical initiators. Azo compounds are preferably used. Particularly preferred is a water-soluble azo compound, for example, hydrochlorides, sulfates or acetates of 2,2'-azobis-2-amidinopropane or azobis-N,N'-dimethyleneisobutylamidine, or alkali metal or ammonium salts of 4,4'-azobis-4-cyanovaleric acid. The amount of radical initiator used is generally in the range of 100 to 10,000 ppm, preferably 500 to 5,000 ppm, based on the weight of starting vinyl compound(s).

Generally, the polymerization is effected at a temperature of 30° to 100° C. for a period of 0.5 to 10 hours, preferably 1 to 8 hours. Since heat is generated during the polymerization, the polymerization system is usually cooled to maintain the polymerization temperature within the above mentioned range.

According to the present invention, hydroxylamine is added to the reaction mixture containing the products after polymerization.

Hydroxylamine is added to the reaction mixture after polymerization, or to a dispersion of the polymer in a solvent after the polymer is filtered out from the reaction mixture. Generally, the reaction mixture or dispersion may be stirred at a temperature of from room temperature to near the polymerization temperature for a period of from 15 minutes to 4 hours, preferably from 30 minutes to 2 hours after addition of hydroxylamine.

The term "after polymerization" herein generally means "after 90% or more, preferably 95% or more, of the starting monomer(s) have been polymerized. Although it is preferred to achieve an amount of remaining monomer(s) as low as possible, the end point of polymerization may be considered to be the time at which the polymerization has been substantially completed in view of the stability of polymers and the efficiency of polymerization.

Hydroxylamine is generally added in the form of a salt of sulfate, hydrochloride or nitrate since the hydroxylamine per se is unstable in air. The hydroxylamine added may be believed to react with unreacted N-vinylcarboxylic acid amide monomers to convert the latter into a stable compound such as an oxime. Impurities capable of producing aldehydes, which may be contained in the starting monomer(s), may also react with the hydroxylamine. Thus, gelling phenomenon will be prevented from taking place. Such impurities may include N-(alpha-methoxyethyl)formamide, N-(alpha-methoxyethyl)acetamide, N-(alpha-hydroxyethyl)formamide, N-(alphahydroxylethyl)acetamide and the like. The amount of hydroxylamine added is generally 0.5 to 10 times by mole, preferably 1 to 3 times by mole, the amount of the remaining monomer(s) in the reaction mixture after polymerization. Thus, a salt of hydroxylamine is generally added in an amount of 0.1 to 20% by weight, preferably 1 to 10% by weight based on the total monomer(s).

After addition of hydroxylamine, the polymer is generally subjected to acidic hydrolysis as a solution or dispersion containing it. The acid used may include, for example, hydrogen chloride, hydrogen bromide, hydrogen fluoride, sulfuric acid, nitric acid, sulfamic acid and alkanesulfonic acids. Preferred is hydrogen chloride, which may be added in the form of either gas or aqueous solution.

The amount of acid used may be suitably determined depending the desired degree of hydrolysis, and generally is 1 to 2 times by equivalent the amount of amide groups in the polymer to be hydrolyzed. The degree of hydrolyzing amide groups in the polymer may preferably be 60% or higher, more preferably 70% or more. The temperature for the hydrolysis of N-vinylformamide polymer is 20° to 130° C., preferably 60° to 120° C. N-vinylacetamide polymer is hydrolyzed at a temperature of 50° to 150° C., preferably 90° to 130° C. The hydrolysis may be effected under pressure, if necessary.

The hydrolyzed or modified products may be, directly or after neutralization, separated by solvent removal or azeotropic distillation in dispersion medium/water, and recovered as powdery water-soluble polymers.

EXAMPLES

The invention will be further illustrated by the following examples which are given by way of example and should not construed as limitative the scope of the invention.

Example 1

Into a 2 liter four-necked flask equipped with a stirrer, a condenser, an addition funnel and a nitrogen inlet, 1,100 g of cyclohexane, 6 g of polyoxyethylene oleyl ether, commercially available under trade name "NEUGEN ET 140E" from DAI-ICHI KOGYO SEIYAKU CO., LTD., Japan, HLB 14.0, 185 g of water, and 15 g of ammonium chloride were charged and the content was heated to 50° C. under stirring.

Under nitrogen gas stream, 6.0 g of a 10% aqueous solution of 2,2'-azobis-2-amidinopropane dihydrochloride was added and a mixture of 170 g N-vinylformamide (91.5% pure) and 140 g acrylonitrile (99.5% pure) was added dropwise over 1.5 hours. After the reaction was continued for an additional hour, 10 g of hydroxylamine sulfate was added and the reaction mixture was maintained at 50° C. (polymerization temperature).

Immediately before the addition of hydroxylamine and after the treatment with hydroxylamine for half an hour, the amounts of remaining N-vinylcarboxylic acid amide monomer were determined by liquid chromatography. The amounts of remaining monomer based on the total amount of monomers used are shown in Table below in units of % by weight.

A portion (100 g) of the reaction mixture was transferred to a 500 ml flask and 19.4 g, i.e. 1.3 times by mole the amount of N-vinylformamide used, of concentrated hydrochloric acid was added. Hydrolysis was effected under stirring at 95° C. for 5 hours. After cooling to room temperature, 200 ml of a mixed conc. hydrochloric acid/methanol (volume ratio 1:10) was added. Washing under stirring, filtering and drying under reduced pressure gave a polymer product.

The reduced viscosity ($\eta sp/c$) and solubility in water of the resulting polymer are shown in Table below.

Determination of reduced viscosity:

A polymer sample (0.1 g) was immersed in 100 g of a 1N saline solution at room temperature for 4 hours to dissolve. The reduced viscosity was measured at 25° C. by an Ostwald viscometer.

Estimation of solubility in water:

A polymer sample (0.1 g) was stirred in 100 g of water at room temperature for 4 hours. The insolubles were observed by naked eye and estimated as follows:

Good: No insoluble;

Fair: Trace amount of very small insolubles; and

Failure: Large amount of insolubles.

Examples 2 TO 11 and Comparative Examples 1 TO 5

The procedures of Example 1 were repeated except that the polymerization temperature, polymerization period, amount of additive were changed as shown in Table below. The results are shown in Table.

EXAMPLE 12

The procedures of Example 1 were repeated except that the starting monomer was only N-vinylformamide and some of the conditions were changed as shown in Table below. The results are shown in Table.

TABLE

| | Polymerization condition | | Hydroxylamine (salt)-treating condition | | Amount of remaining monomer (wt %) | | Test results | |
|---|---|---|---|---|---|---|---|---|
| | Temperature (°C.) | Amount of ammonium chloride added (wt %) | Amount of salt added (wt %) | Time (hr.) | Before treatment | After treatment | Reduced viscosity | Water solubility |
| Example 1 | 55 | 5 | 3 | 0.5 | 1.1 | 0.1 | 3.2 | O |
| Example 2 | 55 | 5 | 1 | 0.5 | 1.1 | 0.2 | 3.2 | O |
| Example 3 | 55 | 0 | 1 | 0.5 | 1.5 | 0.2 | 3.2 | Δ |
| Example 4 | 55 | 1 | 1 | 0.5 | 1.4 | 0.2 | 3.2 | O |
| Example 5 | 50 | 5 | 3 | 2 | 2.7 | 0.1 | 4.0 | O |
| Example 6 | 50 | 5 | 1 | 2 | 2.7 | 0.2 | 4.0 | O |
| Example 7 | 50 | 0 | 5 | 2 | 2.8 | 0.1 | 4.0 | O |
| Example 8 | 50 | 0 | 4 | 2 | 2.8 | 0.1 | 4.0 | O |
| Example 9 | 50 | 0 | 3 | 2 | 2.8 | 0.1 | 4.0 | O |
| Example 10 | 50 | 0 | 1 | 2 | 2.8 | 0.3 | 4.0 | Δ |
| Example 11 | 50 | 0 | 1 | 2 | 2.8 | 0.1 | 4.0 | O |
| Example 12 | 60 | 2 | 3 | 2 | 3.0 | 0 | 5.5 | O |
| Comparative Example 1 | 55 | 5 | 0 | 0.5 | 1.2 | 0.6 | Not measurable | Δ |
| Comparative Example 2 | 55 | 1 | 0 | 0.5 | 1.4 | 0.8 | " | X |
| Comparative Example 3 | 50 | 5 | 0 | 2 | 2.7 | 0.7 | " | Δ |
| Comparative Example 4 | 50 | 2 | 0 | 2 | 2.9 | 0.7 | " | X |
| Comparative Example 5 | 50 | 0 | 0 | 2 | 3.0 | 1.2 | " | X |

O = Good
Δ = Fair
X = Failure

As demonstrated in Examples, water-soluble polymers can be efficiently produced from N-vinylcarboxylic acid amide without forming gels according to the present invention. The water-soluble polymers may be utilizable as flocculants or paper-treating agents in many industrial fields.

What is claimed is:

1. A process for preparing a water-soluble polymer, the process comprising: (A) subjecting monomer(s) comprising an N-vinylcarboxylic acid amide to water-in-oil suspension polymerization; and, after the polymerization is effected until the amount of remaining monomer(s) is 1 to 10%, (B) adding a hydroxylamine salt in an amount by mole 0.5 to 10 times the amount of remaining monomer(s) and 1 to 10% by weight of the total amount of monomer(s) charged before the polymerization; and (C) stirring at a temperature for a period from 30 minutes to 4 hours, followed by acid hydrolysis.

2. The process of claim 1, wherein a water-insoluble hydrocarbon solvent is used as a dispersion medium in an amount of 0.5 to 10 times the weight of the aqueous starting monomer solution.

3. The process of claim 2, wherein the amount of the dispersion medium is 1 to 5 times the weight of the aqueous starting monomer solution.

4. The process of claim 1, wherein the dispersion medium is a hydrocarbon azeotropic with water.

5. The process of claim 4, wherein the dispersion medium is cyclohexane.

6. The process of claim 1, wherein the aqueous solution of starting monomer(s) has a concentration of 5 to 95% by weight.

7. The process of claim 6, wherein the aqueous solution of starting monomer(s) has a concentration of 20 to 80% by weight.

8. The process of claim 1, wherein the other water-soluble vinyl compound copolymerizable with the N-vinylcarboxylic acid amide is acrylonitrile.

9. The process of claim 1, wherein a non-emulsifiable, oil-soluble polymer or a surfactant is used as a dispersion stabilizer in an amount of 0.01 to 5% by weight based on the dispersion medium.

10. The process of claim 9, wherein the amount of the dispersion stabilizer used is 0.05 to 1% by weight based on the dispersion medium.

11. The process of claim 1, wherein 0.1 to 20% by weight, based on the total monomer(s), of a polymerization stabilizer is present in the polymerization system.

12. The process of claim 11, wherein the amount of the polymerization stabilizer present is 1 to 15% by weight.

13. The process of claim 11, wherein the polymerization stabilizer is ammonium or calcium chloride.

14. The process of claim 13, wherein the polymerization stabilizer is ammonium chloride.

15. The process of claim 1, wherein hydroxylamine is added in the form of a salt of hydrochloric, sulfuric or nitric acid.

16. The process of claim 1, wherein the acidic hydrolysis is effected in the presence of hydrogen chloride.

17. The process of claim 16, wherein 60% or more of amide groups is hydrolyzed at 20° to 150° C. in the presence of hydrogen chloride.

18. The process of claim 1, wherein after polymerization and prior to adding the hydroxylamine the amount of remaining monomer(s) is at least about 1.1%.

* * * * *